United States Patent
Kennedy et al.

(10) Patent No.: US 6,971,644 B1
(45) Date of Patent: Dec. 6, 2005

(54) FOLDABLE CUTTING BOARD

(75) Inventors: Timothy J. Kennedy, Staten Island, NY (US); James J. Best, Weehawken, NJ (US); Dean F. DiPietro, Brooklyn, NY (US)

(73) Assignee: Helen of Troy Limited, Bridgetown (BB)

( * ) Notice: Subject to any disclaimer, the term of this patent is extended or adjusted under 35 U.S.C. 154(b) by 0 days.

(21) Appl. No.: 10/917,636

(22) Filed: Aug. 13, 2004

(51) Int. Cl.[7] .................................. B23Q 3/00
(52) U.S. Cl. .................. 269/289 R; 269/302.1
(58) Field of Search ................ 269/302.1, 289 R, 269/900

(56) References Cited

U.S. PATENT DOCUMENTS

| | | | |
|---|---|---|---|
| 2,935,107 A | 5/1960 | Bertelesen et al. | |
| 4,017,063 A | 4/1977 | Brusich | |
| 4,077,123 A | 3/1978 | Popeil et al. | |
| 5,048,689 A * | 9/1991 | McFarland | 206/586 |
| 5,203,548 A * | 4/1993 | Sanders | 269/302.1 |
| 5,386,978 A | 2/1995 | Ladwig | |
| 5,501,441 A | 3/1996 | Kegley | |
| 5,546,852 A | 8/1996 | Bidwell | |
| 5,560,288 A | 10/1996 | Licari | |
| RE36,717 E | 5/2000 | Thompson | |
| 6,164,478 A | 12/2000 | Cant | |
| 6,276,675 B1 * | 8/2001 | Shamoon | 269/289 R |
| D449,766 S | 10/2001 | Wong | |
| 6,460,841 B1 * | 10/2002 | Durr | 269/289 R |
| 6,622,998 B2 | 9/2003 | Wong | |
| 6,702,273 B1 * | 3/2004 | Sellers | 269/289 R |
| 2003/0097915 A1 | 5/2003 | Chen et al. | |

* cited by examiner

*Primary Examiner*—Lee D. Wilson
(74) *Attorney, Agent, or Firm*—Seyfarth Shaw LLP

(57) ABSTRACT

A foldable cutting board has a groove formed in one side thereof to form a thinned region defining a hinge dividing the member into panels which are foldable about the hinge. Stop structure is disposed on at least one panel for engagement with another panel to prevent unfolding of the member beyond a use position wherein the panels are substantially coplanar.

23 Claims, 2 Drawing Sheets

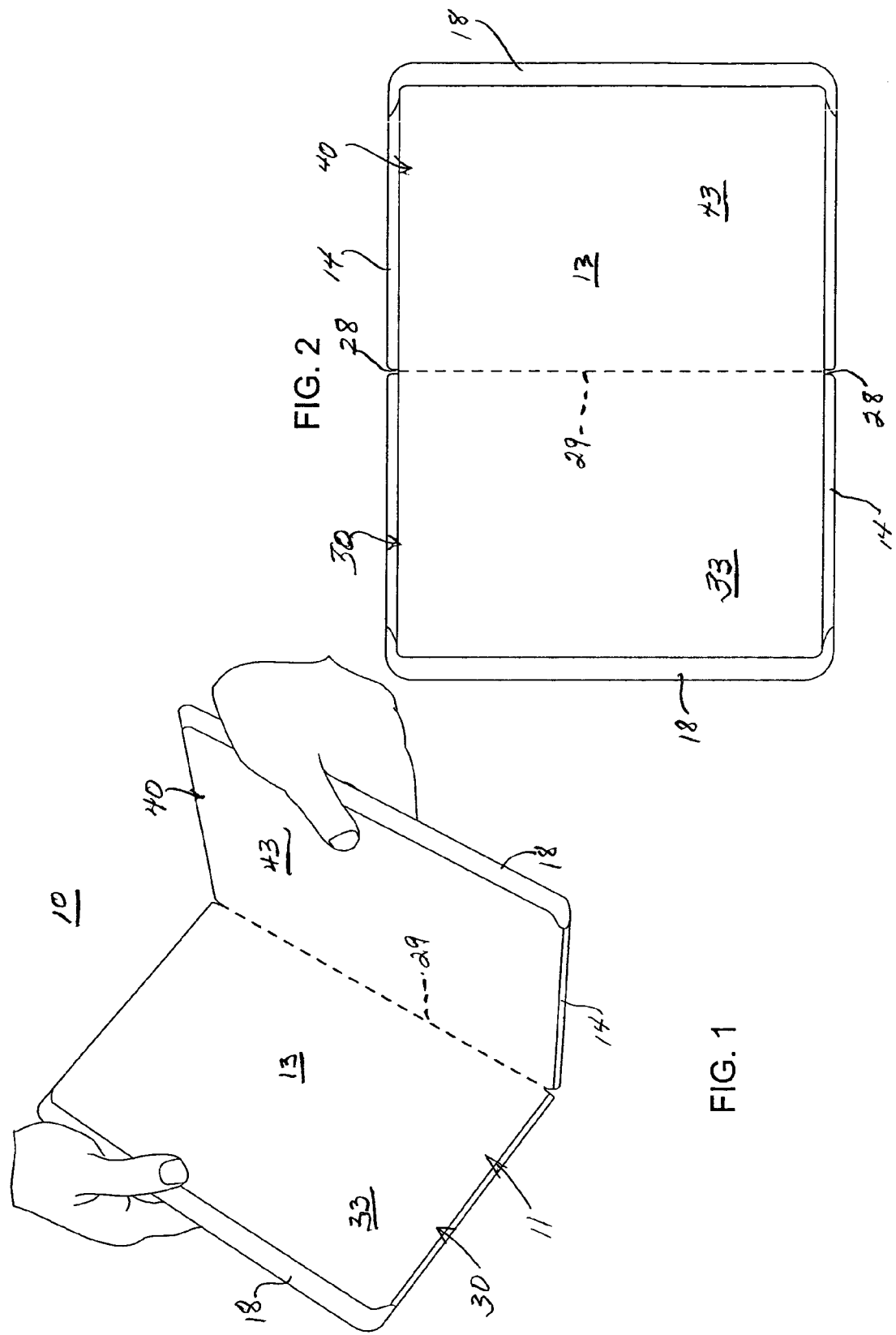

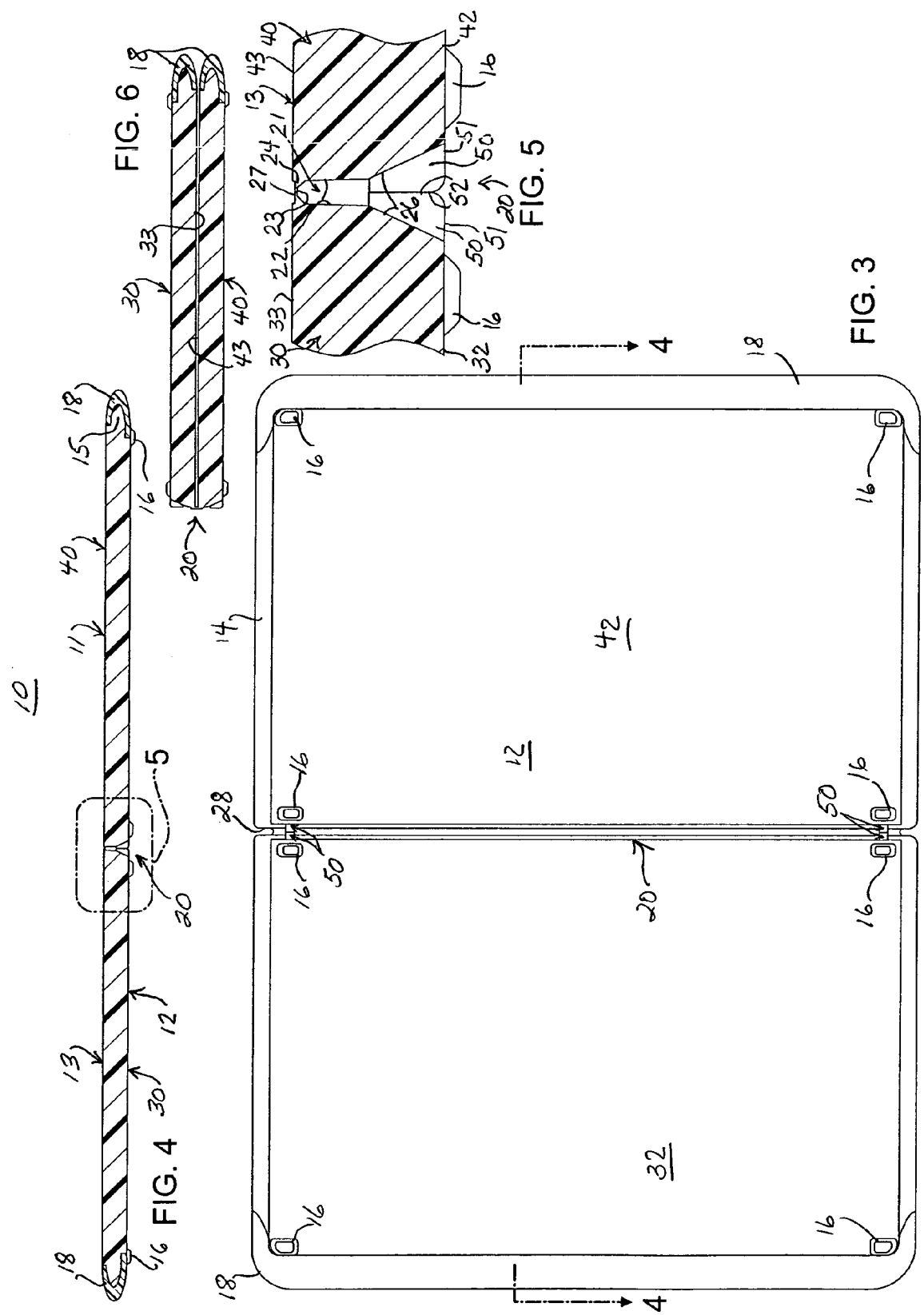

FOLDABLE CUTTING BOARD

BACKGROUND

This application relates to cutting boards and, in particular, to cutting boards of the type which may be used for cutting various food items. The application relates specifically to cutting boards of the foldable type, which have hingedly interconnected parts movable between folded storage and unfolded use positions.

Various types of cutting boards, formed of a variety of different types of materials, have heretofore been provided for kitchen use. Such cutting boards are typically formed of materials which are sufficiently rigid and hard to resist damage by knives or other cutting tools, and also to resist staining by or chemical interaction with food products.

It is also known to provide foldable cutting boards which have hingedly interconnected parts designed to be hingedly moved among different positions. Such boards are typically designed to be moved to a use position where in the hingedly interconnected parts are substantially coplanar and, for storage purposes, to a folded configuration which occupies less space. A disadvantage of many such prior boards is that the hinge arrangement accommodates movement of the hingedly interconnected parts beyond the coplanar use position in a direction away from the folded storage position. This is not a problem when, in use, the board is fully supported by an underlying support surface, such as a table or countertop. However, it makes it impractical to use the unfolded board as a tray for conveying articles, such as cut food items, from one place to another, such as from a countertop to a stove.

SUMMARY

There is disclosed herein an improved foldable cutting board which avoids the disadvantages of prior boards while affording additional structural and operating advantages.

In an embodiment, there is provided a foldable cutting board comprising a flat member having first and second surfaces respectively on opposite sides thereof, a groove formed in the first surface to form a thinned region of the member defining a hinge which divides the member into panels and divides the first surface into panel first surface portions and divides the second surface into panel second surface portions, the panels being foldable about the hinge between a use position wherein the panel second surface portions are substantially coplanar and a folded position wherein the panel second surface portions are disposed in facing and overlapping relationship, and stop structure on at least one panel disposed for engagement with another panel in the use position to prevent the panel second surface portions from moving substantially beyond the coplanar position in a direction away from the folded position.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 1 is a perspective view of a foldable cutting board in a partially folded condition;

FIG. 2 is a top plan view of a cutting board of FIG. 1 in its unfolded, use position;

FIG. 3 is an enlarged, bottom plan view of the cutting board of FIG. 2;

FIG. 4 is a sectional view taken generally along the line 4—4 in FIG. 3;

FIG. 5 is an enlarged, fragmentary view of the circled portion designated by the numeral 5 in FIG. 4; and FIG. 6 is a sectional view similar to FIG. 4, showing the boat in its folded storage position.

DETAILED DESCRIPTION

Referring to FIGS. 1–3, there is illustrated a foldable cutting board, generally designated by the numeral 10. The board 10 has a flat body member 11 having a first lower surface 12 and a second upper surface 13 which are flat, planar surfaces substantially parallel to each other. In the illustrated embodiment, the member 11 is formed of a suitable plastic material, which is sufficiently hard and rigid to be resistant to damage by cutting implements and which also is resistant to staining by or chemical interaction with food items. A suitable material is polypropylene, although other plastic materials could be used. While plastic materials are utilized in the illustrated embodiment, it will be appreciated that, if desired, other materials, such as wood, metal or the like could be used, if desired, and such materials may be desirable if the cutting board is used for cutting items other than food items.

Referring also to FIGS. 4–6, the member 11 is substantially rectangular in shape having parallel side edges 14 and parallel end edges 15, which may be tapered, as can best be seen in FIG. 4. Integral with the lower surface 12 are a plurality of depending feet 16 which, in the illustrated embodiment, are eight in number, although it will be appreciated that any desired number could be utilized. This provides a stable support for the cutting board 10 on underlying support surfaces, while providing a slight clearance between the underlying support surface and the lower support surface 12 of the board. If desired, a grip sheath 18 may be provided along edges of the member 11 to facilitate grasping. In the embodiment shown, such grip sheaths 18 are provided along each of the end edges 15, but it will be appreciated that, if desired, they could also be provided along the side edges 14. The grip sheaths 18 may be formed of a suitable cushioning and frictionally gripping material, such as a suitable elastomer, which may be of the type sold under the trademark SANTOPRENE. The feet 16 may be formed of the same elastomeric material and, indeed, the outer feet adjacent to the grip sheaths 18 may be unitary with the grip sheaths. While a rectangular member 11 is illustrated, it will be appreciated that the cutting board 10 could have other shapes, such as circular and non-rectangular polygonal shapes.

Formed in the lower surface 12 substantially midway between the end edges 15 is a deep hinged groove 20, which extends between the side edges 14. Referring to FIG. 5, the groove 20 may have a relatively narrow inner portion 21 with parallel side surfaces 22 joined by a curved or faceted end surface 23, which is disposed closely adjacent to the upper surface 13 for cooperation therewith to define a thinned region or bridge 14 which forms a flexible living hinge. The groove 20 also has a relatively broad outer portion 25 having tapered side surfaces 26 which diverge outwardly toward the lower surface 12 and opened thereat. If desired, a shallow recess 27 may be formed in the upper surface 13 along the bridge 24 to further thin the material of the bridge and facilitate folding movement. The groove 20 may extend all the way through the thickness of the member 11 at the side edges 14 to define side notches 28. It can be seen that the hinged groove 20 and the thinned bridge 24 defined thereby create a hinge to accommodate folding of the member 11 along the hinge line 29 (see FIGS. 1 and 2).

It can also be seen that the hinge groove 20 divides the member 11 into rectangular panels 30 and 40 and divides the lower surface 12 into lower panel surface portions 32 and 42 and divides the upper surface 13 into panel upper surface portions 33 and 43. The cutting board 10 is foldable about the hinge line 29 between an unfolded use position illustrated in FIGS. 2–4, wherein the panel upper surface portions 33 and 43 are substantially coplanar, and a folded storage position, illustrated in FIG. 6, wherein the panel upper surface portions 33 and 43 are disposed in facing overlapping relationship, and may be in abutting relationship if, as in the illustrated embodiment, the grip sheaths 18 are substantially flush with the panel upper surface portions 33 and 43.

It is a significant aspect of the invention that each of the panels 30 and 40 is provided with plural stop lugs 50 (see FIGS. 3–5). The stop lugs 50 on the panel 30 are arranged substantially as mirror images of those on the panel 40, each stop lug 50 projecting from the associated tapered side surface 26 of the groove 20 and having a bottom surface 51, which may be substantially coplanar with the lower surface 12 of the member 11, and a side or abutment surface 52, which may be substantially perpendicular to the lower surface 12. Thus, when the cutting board 10 is disposed in its unfolded use position described above, the abutment surfaces 52 of the stop lugs 50 on the panel 30 will respectively abut the abutment surfaces 52 on the corresponding stop lugs of the panel 40, as seen in FIG. 5. This will effectively prevent the panels 30 and 40 from pivoting beyond the coplanar use position in a direction away from the folded position of FIG. 6. Thus, when in the use position, the cutting board 10 may be grasped along one of the end edges and lifted and it will remain in its rigid coplanar use position, facilitating use of the unfolded cutting board as a tray or the like.

In the illustrated embodiment, there are two pairs of stop lugs 50 respectively on the panels 30 and 40, with the lugs of each pair being longitudinally spaced apart and respectively disposed closely adjacent to the side edges 14. However, it will be appreciated that other numbers of stop lugs 50 could be provided or, alternatively, a single, long, continuous stop lug on each panel 30 and 40 could be provided. While, in the illustrated embodiment, stop lugs 50 are provided on each of the panels 30 and 40, it will be appreciated that, if desired, lugs could be provided on only one of the panels and shaped and dimensioned for engagement with the opposite side of the groove 20 on the other panel in the use position of the cutting board 10.

In the illustrated embodiment, wherein the stop lugs are respectively adjacent to the inner ones of the feet 16, they may, respectively, be unitary with those feet. In that event, each foot/lug member may be press-fitted into an associated recess (not shown) in the underside of the associated panel 30, 40.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A foldable cutting board comprising:
    a flat member having first and second surfaces respectively on opposite sides thereof,
    a groove formed in the first surface to form a thinned region of the member defining a hinge which divides the member into panels and divides the first surface into panel first surface portions and divides the second surface into panel second surface portions,
    the panels being foldable about the hinge between a use position wherein the panel second surface portions are substantially coplanar and a folded position wherein the panel second surface portions are disposed in facing and overlapping relationship, and
    a stop structure including plural stop members on at least one panel disposed for engagement with another panel in the use position to prevent the panel second surface portions from moving substantially beyond the coplanar position in a direction away from the folded position, wherein the stop structure includes two pairs of stop members respectively on the panels with each pair being disposed at spaced-apart locations on the associated panel.

2. The cutting board of claim 1, wherein the first and second surfaces are substantially parallel to each other.

3. The cutting board of claim 1, wherein the member is formed of a plastic material.

4. The cutting board of claim 3, wherein the plastic material is polypropylene.

5. The cutting board of claim 1, wherein the groove defines converging surfaces respectively on the panels.

6. The cutting board of claim 1, wherein the stop structure is disposed on each of the panels.

7. The cutting board of claim 1, wherein the member includes foot projections depending from the first surface.

8. The cutting board of claim 1, wherein each panel is substantially rectangular in shape.

9. The cutting board of claim 8, wherein the panels are substantially minor images of each other.

10. The cutting board of claim 8, wherein each panel includes a grip sheath disposed along an edge thereof opposite the hinge.

11. The cutting board of claim 10, wherein the grip sheath is formed of an elastomeric material.

12. The cutting board of claim 1, wherein the groove has an inner portion adjacent to the second surface and having substantially parallel side surfaces, and an outer portion opening at the first surface and having inclined side surfaces diverging toward the first surface.

13. A foldable cutting board comprising:
    a flat member having first and second surfaces respectively on opposite sides thereof,
    a groove formed in the first surface to form a thinned region of the member defining a hinge which divides the member into panels and divides the first surface into panel first surface portions and divides the second surface into panel second surface portions, wherein the groove has an inner portion adjacent to the second surface and having substantially parallel side surfaces, and an outer portion opening at the first surface and having inclined side surfaces diverging toward the first surface,
    the panels being foldable about the hinge between a use position wherein the panel second surface portions are substantially coplanar and a folded position wherein the panel second surface portions are disposed in facing and overlapping relationship, and a stop structure on at least one panel disposed for engagement with another panel in the use position to prevent the panel second surface portions from moving substantially beyond the coplanar position in a direction away from the folded position.

14. The cutting board of claim 13, wherein the first and second surfaces are substantially parallel to each other.

15. The cutting board of claim 13, wherein the member is formed of polypropylene.

16. The cutting board of claim 13, wherein the groove defines converging surfaces respectively on the panels.

17. The cutting board of claim 13, wherein the stop structure is disposed on each of the panels.

18. The cutting board of claim 13, wherein the stop structure includes plural stop members.

19. The cutting board of claim 13, wherein the member includes foot projections depending from the first surface.

20. The cutting board of claim 13, wherein each panel is substantially rectangular in shape.

21. The cutting board of claim 20, wherein the panels are substantially mirror images of each other.

22. The cutting board of claim 20, wherein each panel includes a grip sheath disposed along an edge thereof opposite the hinge.

23. The cutting board of claim 22, wherein the grip sheath is formed of an elastomeric material.

* * * * *

UNITED STATES PATENT AND TRADEMARK OFFICE
CERTIFICATE OF CORRECTION

PATENT NO. : 6,971,644 B1
DATED : December 6, 2005
INVENTOR(S) : Timothy J. Kennedy et al.

It is certified that error appears in the above-identified patent and that said Letters Patent is hereby corrected as shown below:

Column 4,
Line 42, "minor" should be -- mirror --.

Signed and Sealed this

Fourteenth Day of March, 2006

JON W. DUDAS
*Director of the United States Patent and Trademark Office*